(12) United States Patent
Montierth et al.

(10) Patent No.: US 7,637,620 B2
(45) Date of Patent: Dec. 29, 2009

(54) LID STRUCTURE, APPARATUS AND METHOD FOR DISPLAYING GRAPHICAL INFORMATION

(75) Inventors: Mark D. Montierth, Meridian, ID (US); James A. Hall, Jr., Boise, ID (US)

(73) Assignee: Marvell International Technology Ltd. (BM)

( * ) Notice: Subject to any disclaimer, the term of this patent is extended or adjusted under 35 U.S.C. 154(b) by 527 days.

(21) Appl. No.: 11/385,623

(22) Filed: Mar. 21, 2006

(65) Prior Publication Data
US 2007/0223012 A1    Sep. 27, 2007

(51) Int. Cl.
| | |
|---|---|
| G03B 21/28 | (2006.01) |
| G03B 21/26 | (2006.01) |
| G03B 21/14 | (2006.01) |
| G03B 21/22 | (2006.01) |
| G03B 21/06 | (2006.01) |
| G02B 5/32 | (2006.01) |
| G02B 26/02 | (2006.01) |
| H04N 1/46 | (2006.01) |
| H04N 1/04 | (2006.01) |

(52) U.S. Cl. ............... 353/98; 353/94; 353/119; 353/37; 353/64; 353/65; 359/17; 359/234; 359/298; 358/506; 358/408; 358/474; 358/494

(58) Field of Classification Search ............... 353/98, 353/94, 119, 122, 37, 63, 64, 65; 359/17, 359/202, 201, 234, 298; 358/505, 506, 408, 358/474, 494
See application file for complete search history.

(56) References Cited

U.S. PATENT DOCUMENTS

| | | | |
|---|---|---|---|
| 6,369,833 B1 | 4/2002 | van Liempd et al. | |
| 6,661,542 B1* | 12/2003 | Mangerson | 358/484 |
| 2003/0174120 A1* | 9/2003 | Weiner et al. | 345/156 |

* cited by examiner

*Primary Examiner*—Diane I Lee
*Assistant Examiner*—Magda Cruz

(57) ABSTRACT

A lid structure, apparatus and method for displaying graphical information uses beams of coherent light that are emitted in a scanning manner to project the beams of coherent light onto a display surface to form the graphical information on the display surface.

20 Claims, 8 Drawing Sheets

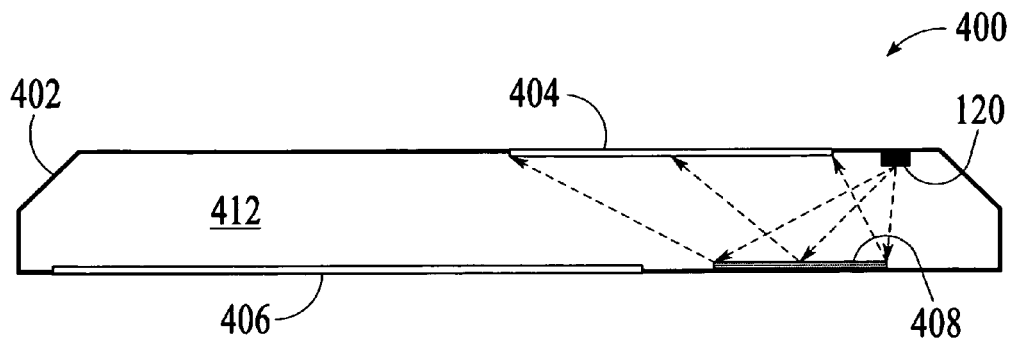
FIG.4A
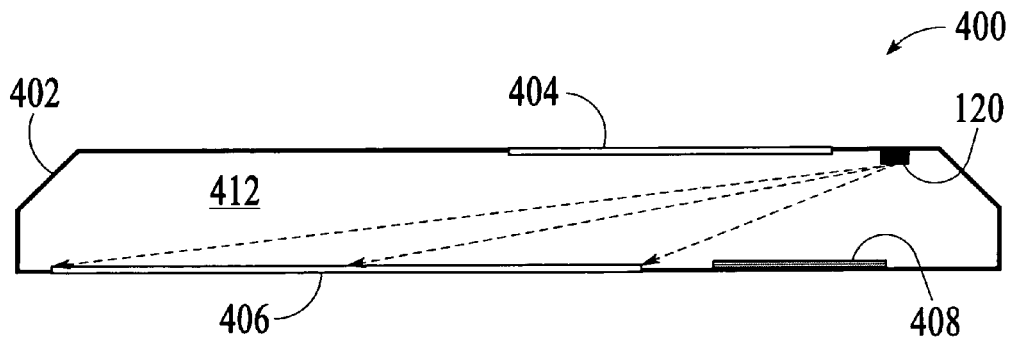
FIG.4B
| Open a lid structure of an electrical apparatus to expose a display surface on the bottom side of the lid structure | 502 |
↓
| Emit beams of coherent light onto the display surface of the electrical apparatus and scan the beams of coherent light across the display surface to form graphical information on the display surface | 504 |
FIG.5

LID STRUCTURE, APPARATUS AND METHOD FOR DISPLAYING GRAPHICAL INFORMATION

BACKGROUND OF THE INVENTION

Many electrical products include a display device to display menus, commands, inputs and other graphical information so that users are able to configure and operate the products. As an example, a combined scan, copy and print device or an "All In One" (AIO) device typically includes an LCD display to display commands, e.g., "set number of copies" or "adjust contrast", and inputs, e.g., the number "1" or the word "normal". Since display devices are relatively expensive, cost sensitive products typically include a low-cost display device, such as a small character LCD display, which may be ambient-lit or self-illuminating.

A concern with these electrical products with a small LCD display is that the display is difficult to read, especially if the display is an ambient-lit display. In addition, the viewing angle of the LCD display is typically narrow. Consequently, a user may have bend down to look at the display more closely to read the displayed information. Since a single command may require several buttons to be pressed, the user may have to maintain the compromised posture for a significant period of time.

Another concern is that the small size of the LCD display limits the amount of characters that can be displayed. As an example, a small LCD display may be limited to twenty characters on two lines. Thus, in this example, a user may have to navigate through a complex maze of menus to find the desired selection.

These concerns can be resolved by using a more sophisticated display. Improvements in display technology, such as ¼ VGA, have enhanced readability and viewing angle. However, the use of these sophisticated displays will add significant cost to the end products.

In view of these concerns, what is needed is an electrical apparatus and method for displaying graphical information on a large area with increased viewing angle and enhanced readability without significant increase in cost.

SUMMARY OF THE INVENTION

A lid structure, apparatus and method for displaying graphical information uses beams of coherent light that are emitted in a scanning manner to project the beams of coherent light onto a display surface to form the graphical information on the display surface. The use of the scanned beams of coherent light to form the graphical information on the display surface eliminates the need to include an electronic display on the apparatus, which may introduce increased cost or limitations, such as narrow viewing angle and inadequate readability.

An apparatus in accordance with an embodiment of the invention comprises a display surface, a scanning light device configured to emit beams of coherent light in a scanning manner to project the beams of coherent light onto the display surface, and a controller operably connected to the scanning light device to control emission and scanning of the beams of coherent light from the scanning light device onto the display surface to form graphical information on the display surface.

A lid structure in accordance with an embodiment of the invention comprises a housing having top and bottom sides, a translucent panel attached to the housing at one of the top and bottom sides to provide a display surface, and a scanning light device attached to the housing in an interior region of the housing. The scanning light device is configured to emit beams of coherent light in a scanning manner to project the beams of coherent light onto the translucent panel to display graphical information on the display surface.

A method for displaying graphical information in accordance with an embodiment of the invention comprises emitting beams of coherent light onto a display surface of an electrical apparatus, including scanning the beams of coherent light across the display surface of the electrical apparatus to form graphical information on the display surface of the electrical apparatus.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIGS. 4A and 4B are cross-sectional views of a scanner lid in accordance with an embodiment of the invention.

FIG. 5 is a flow diagram of a method for displaying graphical information in accordance with an embodiment of the invention.

DETAILED DESCRIPTION

Figure 1A:
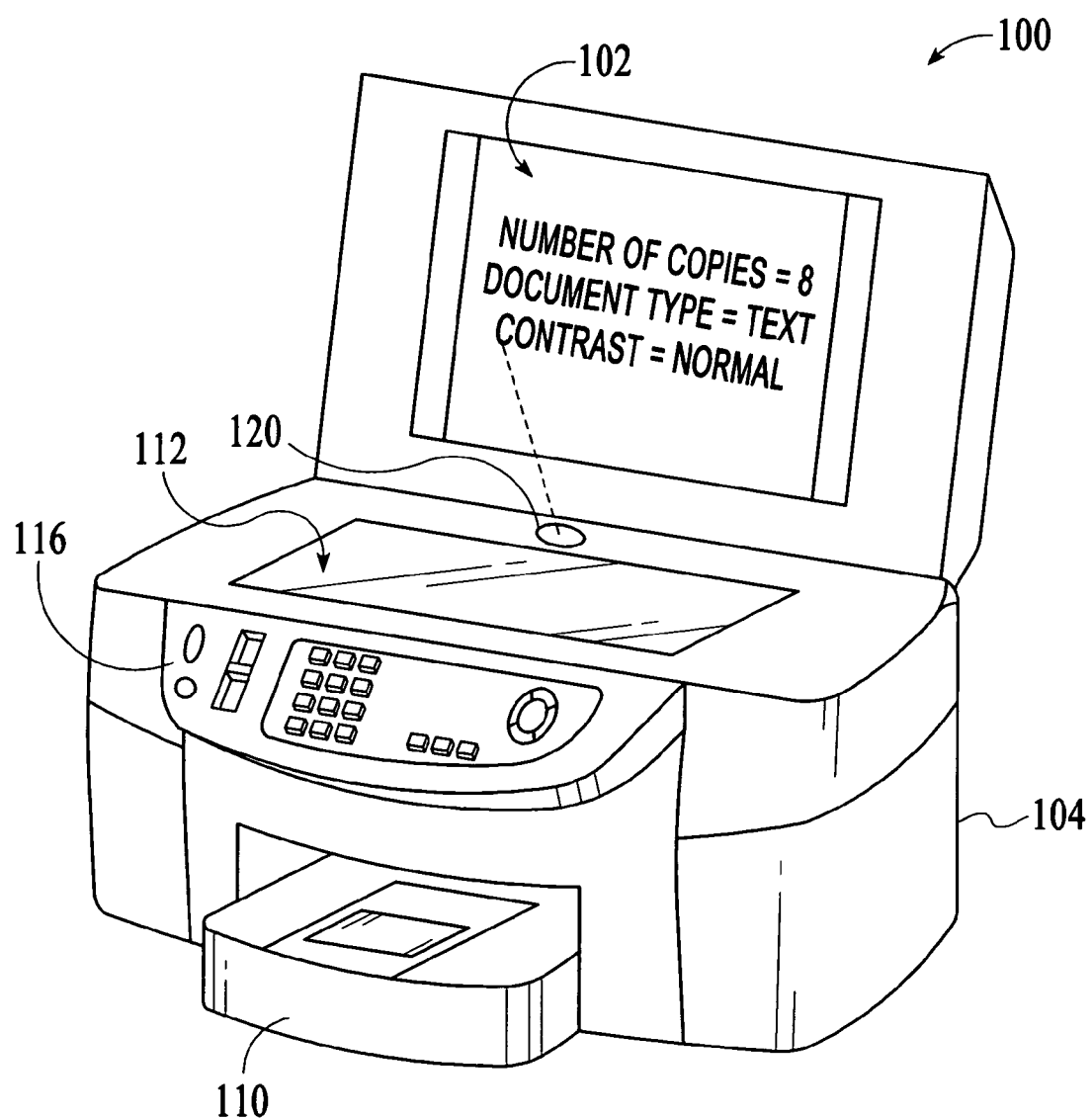
FIG. 1A is a perspective view of an electrical apparatus in accordance an embodiment of the invention.
Figure 1B:
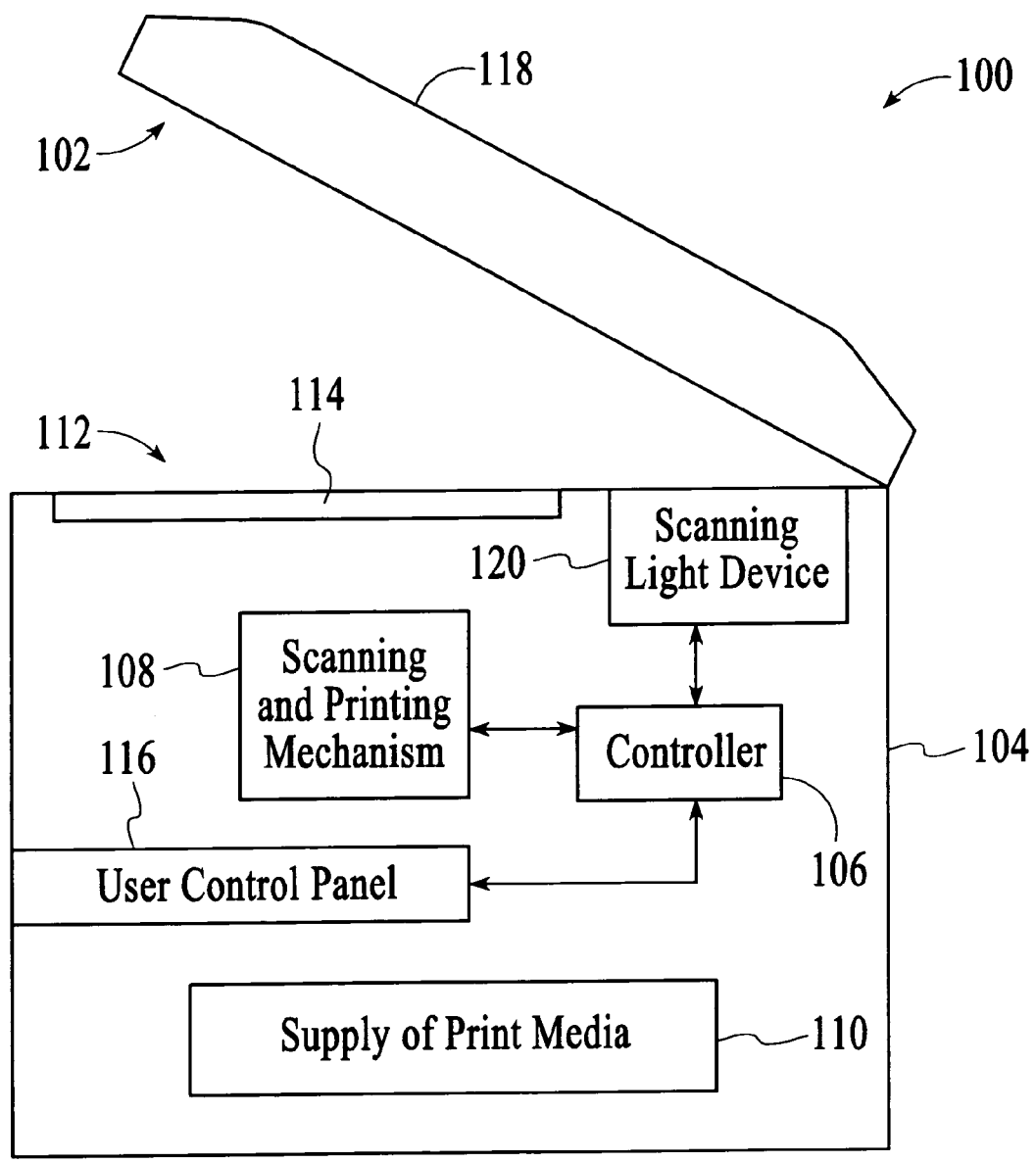
FIG. 1B is a block diagram of the components included in the electrical apparatus of FIG. 1A in accordance an embodiment of the invention.

An electrical apparatus 100 in accordance with an embodiment of the invention is shown in FIGS. 1A and 1B. As described in more detail below, the electrical apparatus 100 uses multiple beams of coherent light to display graphical information on a display surface 102 of the apparatus. Thus, the electrical apparatus 100 does not need a conventional electronic display device, such as an LCD display. Consequently, the electrical apparatus 100 does not suffer from narrow viewing angle and reduced readability associated with a low cost display device, such as a small character LCD display, or significant increase in cost associated with a sophisticated display device, such as a ¼ VGA display. The electrical apparatus 100 is illustrated in FIG. 1A as being a combined scan, copy and print device or an "All In One" (AIO) device. However, in other embodiments, the electrical apparatus 100 can be any electrical product that needs to display graphical information.

As shown in FIG. 1B, the AIO device 100 includes a housing structure 104, which houses the internal components of the AIO device. The internal components include a controller 106, a scanning and printing mechanism 108 and a supply of print media 110. The controller 106 is configured to transmit, receive and process signals from various components of the AIO device 100 to control the functions of the AIO device. As described in more detail below, the controller 106 controls the display function of the AIO device 100. The controller 106 can be implemented as one or more digital signal processors. The scanning and printing mechanism 108 is configured to electronically scan an object placed on a scanning surface 112, which is provided by a transparent panel 114 attached to the housing structure 104 and positioned at the upper surface of the housing structure. The scanned image can be printed onto a print medium, e.g., a sheet of paper, from the supply of print media 110 by the scanning and printing mechanism 108, or transmitted to a computer (not shown) connected to the AIO device 100. The scanning and printing mechanism 108 can also print an electronic file, such as an electronic document or a digital image file, from the connected computer onto a print medium. Therefore, the AIO device 100 is able to perform copy, scan and print functions. The scanning and printing mechanism 108 is a common component found in conventional AIO devices, and thus, is not described herein in detail.

The AIO device 100 further includes a user control panel 116, a scanner lid 118 and a scanning light device 120. The user control panel 116 is attached to the housing structure 104, as shown in FIG. 1A, and includes controls, such as buttons, dials, levers and/or knobs, to allow a user to enter inputs into the AIO device 100. The user control panel 116 is connected to the controller 106 to transmit the inputs entered by a user through the controls on the user control panel. The scanner lid 118 is attached to the housing structure 104 such that the scanner lid can be pivoted to open the scanner lid, which exposes the transparent scanning surface 112 of the AIO device 100. The scanner lid 118 is a structure that includes a planar lower surface, which faces the transparent scanning surface 112 when the scanner lid is closed. Thus, when the scanner lid 118 is closed, the lower surface of the scanner lid is not visible to a user. However, when the scanner lid 118 is opened, the lower surface of the scanner lid becomes visible to the user. This lower surface of the scanner lid 118 is used as the display surface 102 of the AIO device 100 to display graphical information, such as commands to enter inputs, e.g., "set number of copies" or "adjust contrast", and entered inputs, e.g., the number "1" or the word "normal". The graphical information is displayed on the display surface, i.e., the lower surface of the scanner lid, by the scanning light device 120 of the AIO device 100.

The scanning light device 120 is configured to project one or more scanning beams of coherent light onto the display surface 102 of the scanner lid 118 to produce graphical information on the display surface. Graphical information may include letters, numbers and symbols (collectively referred to herein as "symbols"). The scanning light device 120 is attached to the housing structure 104 and is positioned on the housing structure to project the scanning beams of coherent light onto the display surface 102 of the scanner lid 118 when the scanner lid is opened. As illustrated in FIG. 1A, the scanning light device 120 is positioned at the upper surface of the housing structure 104 at a location adjacent to the scanning surface 112 and near the back of the housing structure. However, in other embodiments, the scanning light device 120 can be positioned anywhere on the housing structure 104 as long as the scanning light device can project scanning beams of coherent light onto the display surface 102 of the scanner lid 118 when the scanner lid is opened. The scanning light device 120 is connected to the controller 106, which controls the emission and scanning of beams of coherent light from the scanning light device.

Figure 2:
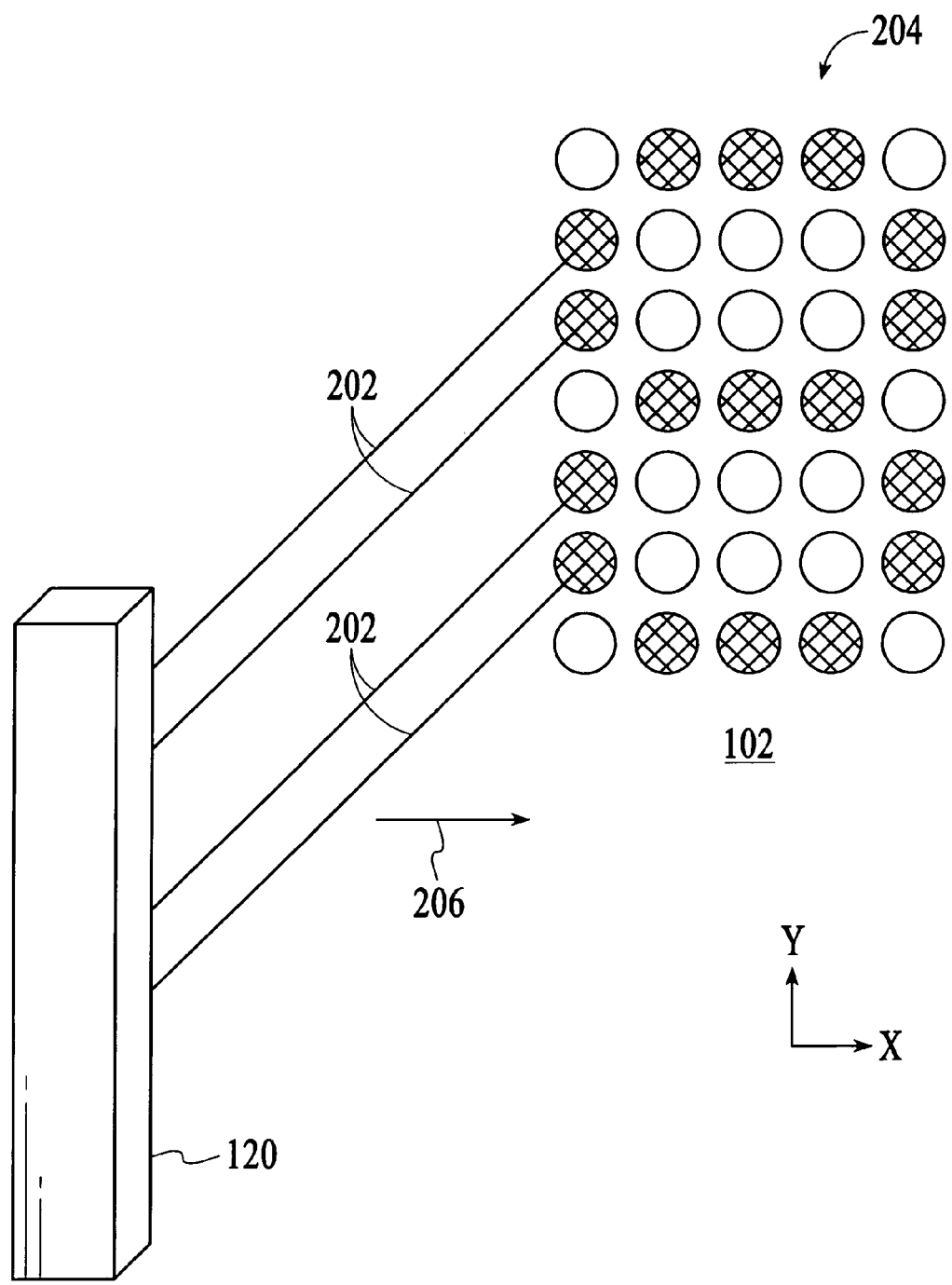
FIG. 2 illustrates how graphical information is formed on a display surface by emitting beams of coherent light in a scanning manner in accordance with an embodiment of the invention.

The scanning light device 120 produces graphical information on the display surface 102 of the scanner lid 118 by emitting beams of coherent light at different locations on the display surface in a scanning manner. As used herein, emitting beams of coherent light in a scanning manner means that the beams of coherent light are emitted such that the beams are sequentially emitted along a predefined direction. For example, as illustrated in FIG. 2, the number "8" can be generated by emitting beams 202 of coherent light at selected locations of a five-by-eight (5×8) matrix 204 of possible locations on the display surface 102 in a scanning manner along a longitudinal direction (X direction), as indicated by the arrow 206. In FIG. 2, the crosshatched locations are the selected locations at which the beams 202 of coherent light are projected onto the display surface 102 as the beams are scanned along the longitudinal direction to form the number "8". In this example, the scanning light device 120 includes a set of seven light sources to emit up to seven beams of coherent light at a given moment during the scanning process so that every selected location on a particular column of the matrix 204 can be emitted with a beam of coherent light. Other symbols can be produced on the display surface 102 by emitting and scanning beams of coherent light at different selected locations of the matrix 204.

In the manner described above, a line of symbols can be displayed on the display surface 102 of the scanner lid 118 by emitting beams of coherent light in a single linear scan across the display surface. One or more additional lines of symbols can be displayed on the display surface 102 of the scanner lid 118 by further emitting beams of coherent light in a linear scan across the display surface, below or above the previously displayed line of symbols. This would require one additional linear scan for each additional line of symbols. Alternatively, the scanning light device 120 may include additional sets of light sources to display multiple lines of symbols with a single linear scan across the display surface 102 of the scanner lid 118.

Figure 3A:
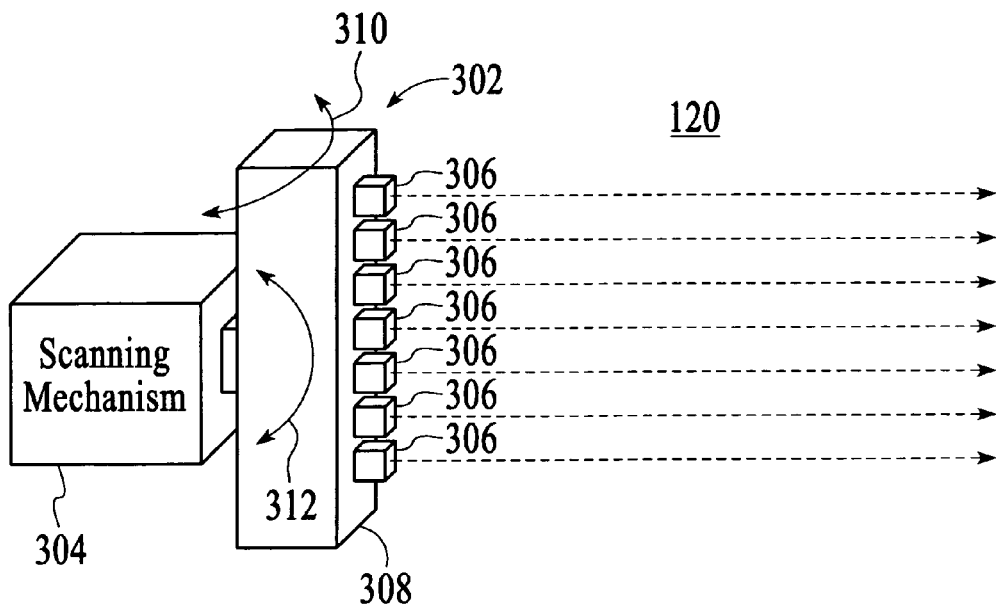
FIGS. 3A-3E are perspective views of a scanning light device of the electrical apparatus of FIGS. 1A and 1B in accordance with different embodiments of the invention.

In an embodiment, as illustrated in FIG. 3A, the scanning light device 120 includes a single line beam generator 302 and a scanning mechanism 304. The single line beam generator 302 is designed to emit beams of coherent light that can be linearly scanned to produce a single line of symbols on the display surface 102 of the scanner lid 118 (not shown in FIG. 3A). In this embodiment, the single line beam generator 302 includes a set of seven lasers 306, which are linearly mounted on a substrate 308 to form a linear array of lasers. However, in other embodiments, the beam generator 302 may include fewer or more lasers. The lasers 306 may be laser diodes, such as vertical cavity surface emitting lasers (VCSELs), or any other type of lasers. In alternative embodiments, the single line beam generator 302 may include other light sources, such as light emitting diodes (LEDs) with optical components, which can produce beams of coherent light. The beam generator 302 is attached to the scanning mechanism 304, which is designed to move the beam generator. Specifically, the scanning mechanism 304 can pivot or pan the beam generator 302, as shown by the curved arrow 310 in FIG. 3A, so that the emitted beams of coherent light, i.e., beams of laser light, can be scanned across the display surface 102 along the longitudinal direction to produce a line of symbols on the display surface. In this embodiment, the scanning mechanism 304 is also designed to tilt the beam generator 302, as shown by the curved arrow 312 in FIG. 3A, so that beams of coherent light can scanned be across the display surface 102 along the longitudinal direction at different vertical positions to display additional lines of symbols on the display surface.

In an alternative embodiment, the beam generator 302 may include fewer lasers than the number of lasers needed to produce a single line of symbols with a single linear scan of beams of coherent light. In this alternative embodiment, multiple linear scans of beams of coherent light are needed to produce a single line of symbols.

Figure 3B:
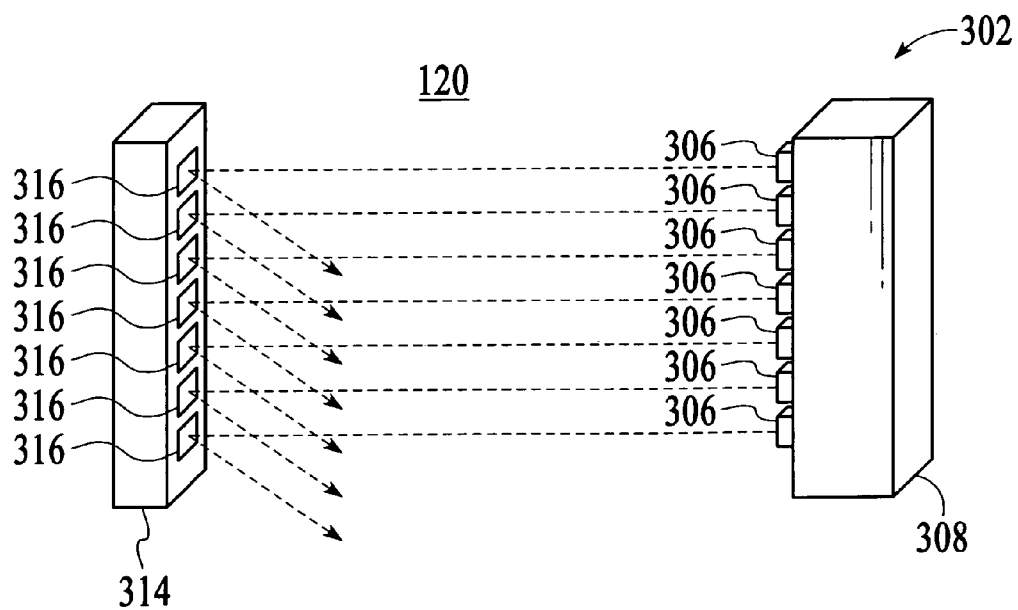

In another embodiment, as illustrated in FIG. 3B, the scanning light device 120 includes the single line beam generator 302 and a scanning reflective device 314. In this embodiment, the beam generator 302 is designed to be stationary. Thus, the beam generator 302 cannot be panned or tilted to change the direction of the beams of coherent light emitted from the lasers 306. Rather, the scanning reflective device 314 operates to reflect the beams of coherent light from the lasers 306 of the beam generator 302 at different angles to change the direction of the beams so that the beams can be projected onto desired locations on the display surface 102 (not shown in FIG. 3B). The scanning reflective device 314 includes seven movable mirrors 316 for the seven lasers 306 of the beam generator 302. Each movable mirror 316 is positioned to receive beams of coherent light from one of the lasers 306 of the beam generator 302 and to reflect those beams to selected locations on the display surface 102 of the scanner lid 118 in the X and/or Y directions. Thus, beams of coherent light from the lasers 306 of the beam generator 302 can be scanned by the movable mirrors 316 of the scanning reflective device 314 across the display surface 102 so that one or more lines of symbols can be displayed on the display surface. In this embodiment, the movable mirrors 316 are part of a microelectromechanical systems (MEMS) device, and thus, the scanning reflective device 314 is a MEMS mirror array device. In an alternative embodiment, the movable mirrors 316 may be multifaceted reflective optical elements attached to mechanisms to move the optical elements to selectively reflect beams of coherent light from the lasers 306 onto selected locations on the display surface 102.

In an alternative embodiment, the beam generator 302 and the scanning reflective device 314 may include fewer lasers and movable mirrors, respectively, than the number of lasers and movable mirrors needed to produce a single line of symbols with a single linear scan of beams of coherent light. In this alternative embodiment, multiple linear scans of beams of coherent light are needed to produce a single line of symbols.

Figure 3C:
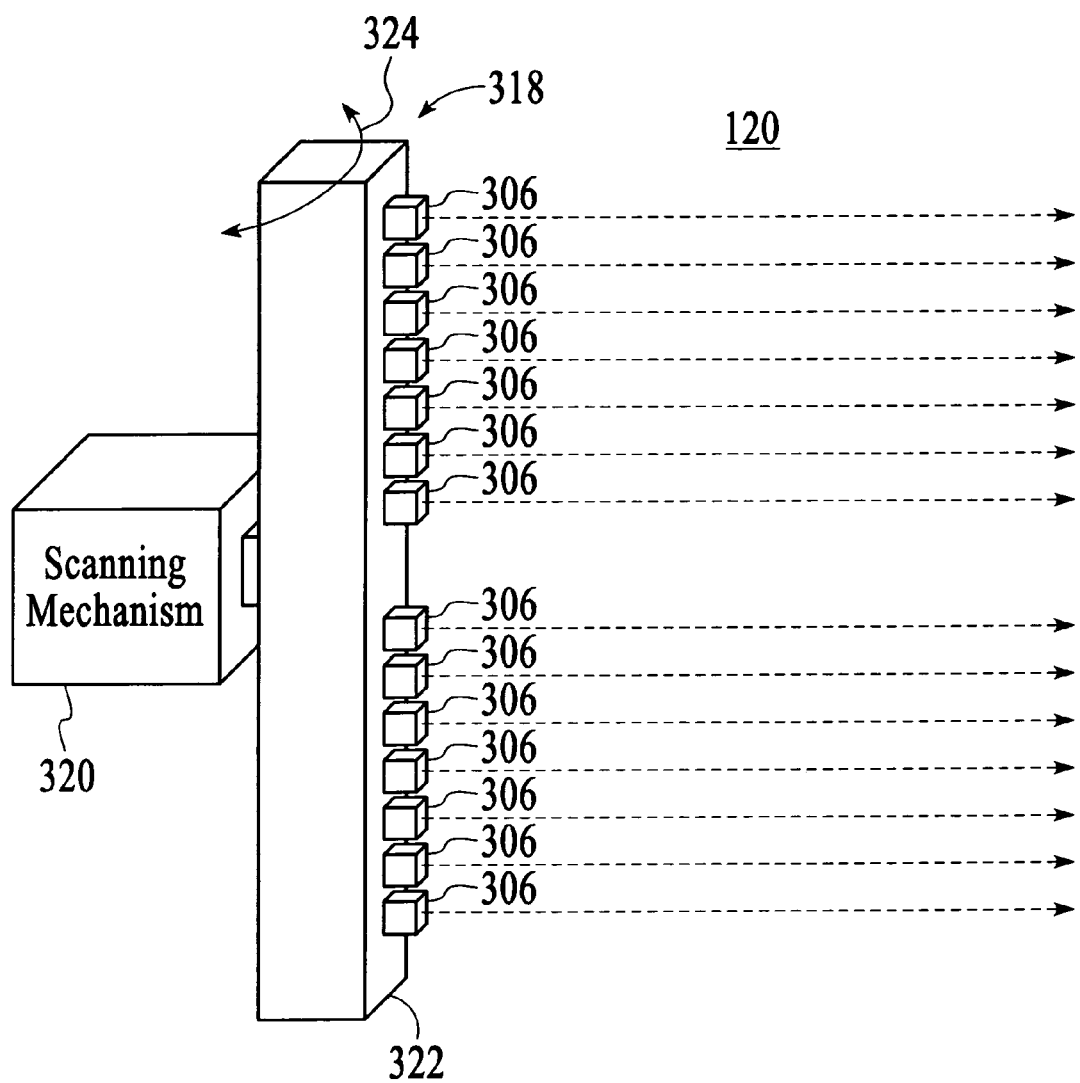

In another embodiment, as illustrated in FIG. 3C, the scanning light device 120 includes a multi-line beam generator 318 and a scanning mechanism 320. The multi-line beam generator 318 is designed to produce multiple sets of beams of coherent light. In this embodiment, the multi-line beam generator 318 includes two sets of seven lasers 306, which are linearly mounted on a substrate 322 to form a linear array of lasers with a sufficient space between the two sets of lasers. Thus, in this embodiment, the multi-line beam generator 318 can be used to produce two lines of symbols with a single linear scan across the display surface 102 of the scanner lid 118 (not shown in FIG. 3C) in the X direction. However, in other embodiments, the multi-line beam generator 318 may include additional sets of lasers to produce more than two lines of symbols with a single linear scan. Furthermore, in other embodiments, each set of lasers in the multi-line beam generator 318 may include fewer or more lasers. The lasers 306 included in the multi-line beam generator 318 may be any type of lasers. In other embodiments, the multi-line beam generator 318 may include other types of light sources that can produce beams of coherent light. The multi-line beam generator 318 is attached to the scanning mechanism 320, which is designed to only pan the multi-line beam generator, as shown by the curved arrow 324 in FIG. 3C, so that beams of coherent light from the lasers 306 can be scanned across the display surface 102 in the X direction to produce two lines of symbols for each linear scan.

Figure 3D:
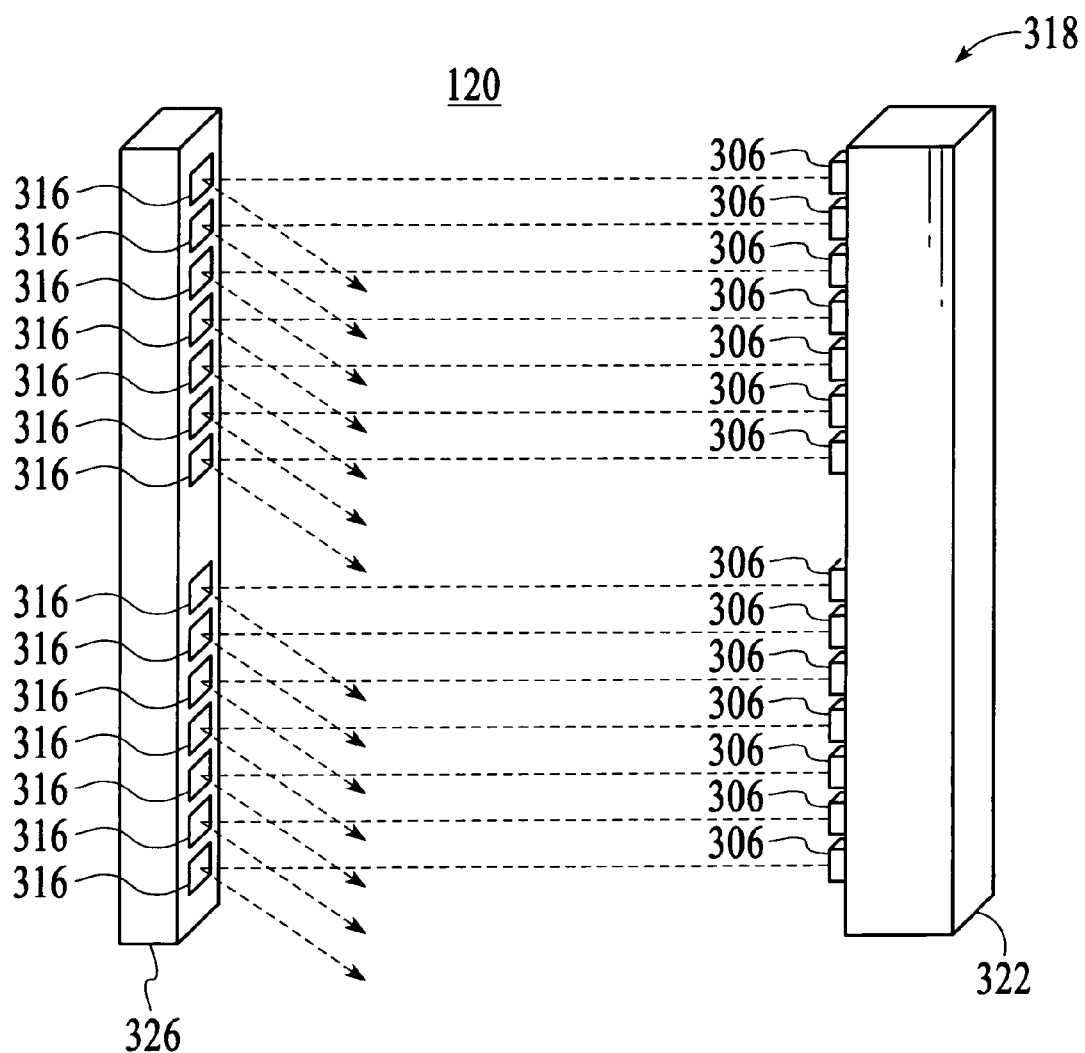
Figure 3E:
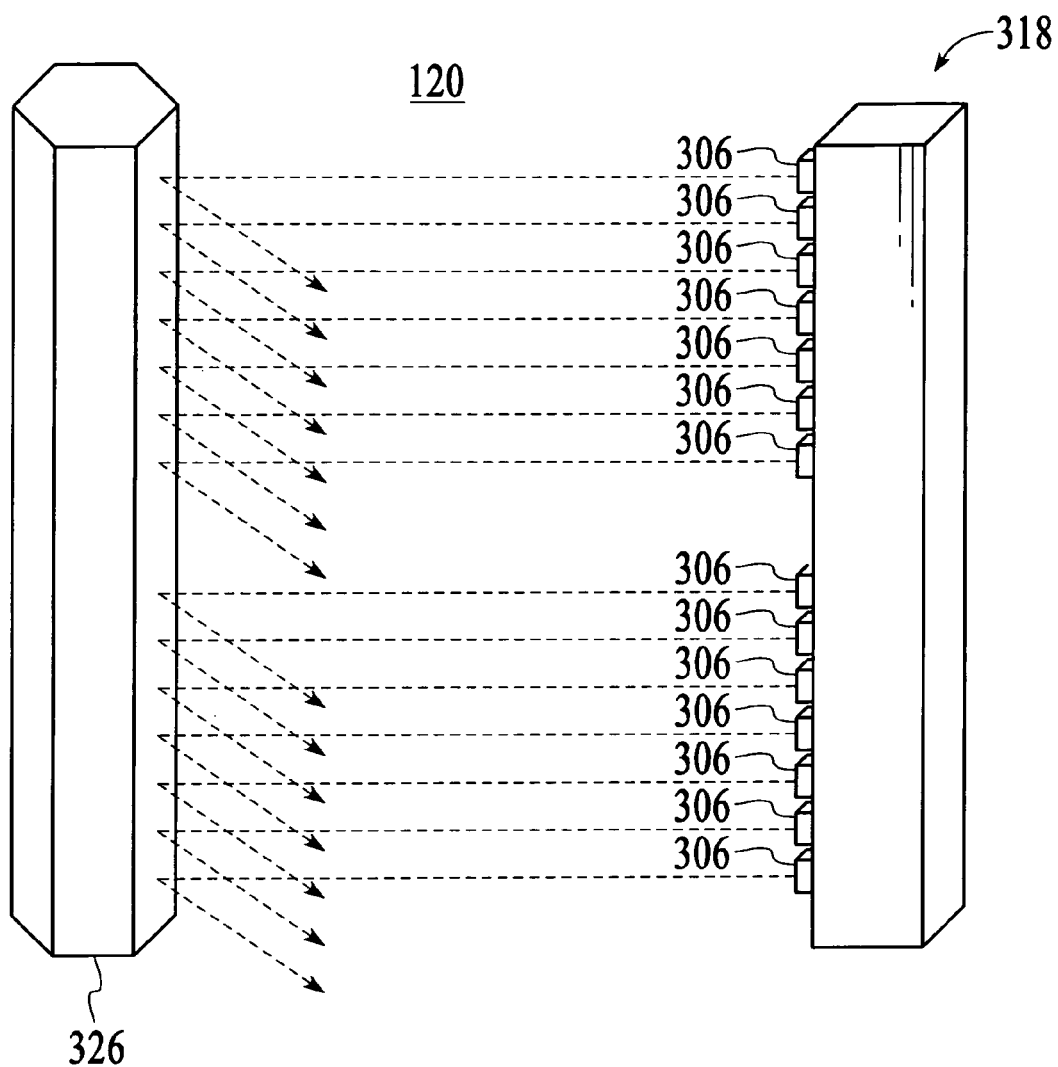

In another embodiment, as illustrated in FIG. 3D, the scanning light device 120 includes the multi-line beam generator 318 and a scanning reflective device 326. In this embodiment, the multi-line beam generator 318 is designed to be stationary. Thus, the multi-line beam generator 318 cannot be panned to change the direction of the beams of coherent light emitted from the lasers 306. Rather, the scanning reflective device 326 operates to redirect the beams of coherent light from the lasers 306 of the multi-line beam generator 318 to linear scan the beams across the display surface 102 (not shown in FIG. 3D) in the X-direction. In one implementation, the scanning reflective device 326 includes two sets of seven movable mirrors 316 for the two sets of seven lasers 306 of the multi-line beam generator 318 so that each movable mirror can reflect beams from a particular laser, as shown in FIG. 3D. Thus, the number of movable mirrors 316 in the scanning reflective device 326 would be increased if there were more lasers 306 in the multi-line beam generator 318. In the embodiment of FIG. 3D, the movable mirrors 316 are part of a MEMS device, and thus, the scanning reflective device 326 is a MEMS mirror array device. In an alternative embodiment, the movable mirrors 316 may be multifaceted reflective optical elements attached to mechanisms to move the optical elements to selectively reflect beams of coherent light from the lasers 306 onto selected locations on the display surface 102. In another implementation, as illustrated in FIG. 3E, the scanning reflective device 326 is a multifaceted cylindrical mirror, which is connected to a mechanism (not shown) to selectively rotate the mirror to reflect the beams of coherent light from the lasers 306 of the multi-line beam generator 318 to linear scan the beams across the display surface 102 in the X direction.

Turning now to FIGS. 4A and 4B, a lid structure 400 in accordance with an embodiment of the invention is shown. The lid structure 400 is described herein as a scanner lid of an AIO device, which includes components commonly found in a conventional AIO device, such as the controller 106, the scanning and printing mechanism 108, the supply of print media 110, the transparent scanning panel 114, the user control panel 116 of the AIO device 100 of FIGS. 1A and 1B. However, the lid structure 400 can be any structural component of an electronic product. The scanner lid 400 includes a scanner housing 402, a top translucent panel 404, an optional bottom translucent panel 406, a reflective element 408 and a scanning light device 120. The scanner lid 400 operates to project beams of coherent light onto one of the translucent panels 404 and 406 to display graphical information.

The scanner housing 402 provides structural support for the components of the scanner lid 400. The scanner housing 402 is configured to have an interior region 412 defined by top and bottom sides of the scanner housing. The top translucent panel 404 is attached to the scanner housing 402 at the top side of the housing, while the bottom translucent panel 406 is attached to the scanner housing at the bottom side of the housing. The top side of the scanner housing 402 is the exposed side of the scanner lid 400 when the scanner lid is closed. Thus, the bottom side of the scanner housing 402 is the surface that faces the scanning surface of the AIO device when the scanner lid is closed. As an example, the translucent panels 404 and 406 may be sheets of plastic material with translucent properties. As described in more detail below, the top and bottom translucent panels 404 and 406 provide top and bottom display surfaces, respectively, on which graphical information can be displayed in accordance with embodiments of the invention.

The reflective element 408 is attached to the bottom side of the scanner housing 402 in the interior region 412 of the scanner lid 400. The reflective element 408 has a reflective surface, which is exposed to the interior region 412 of the scanner lid 400. The scanning light device 120 is attached to the top side of the scanner housing 402 in the interior region 412 of the scanner lid 400. The scanning light device 120 operates to emit beams of coherent light in a scanning manner. The scanning light device 120 is connected to a controller, such as the controller 106 shown in FIG. 1B, which controls the emission and scanning of beams of coherent light from the scanning light device. Since the scanning light device 120 was previously described, the scanning light device is not further described. The scanning light device 120 operates to either project beams of coherent light directly onto the bottom translucent panel 406, as illustrated in FIG. 4B, or onto the top translucent panel 404 via the reflective element 408, as illustrated in FIG. 4A. The top translucent panel 404 is used as a display surface when the scanner lid 400 is closed so that graphical information can be displayed on the exposed top surface of the scanner lid. The bottom translucent panel 406 is used as a display surface when the scanner lid 400 is opened so that graphical information can be displayed on the exposed bottom surface of the scanner lid.

In an alternative embodiment, the scanner lid 400 is essentially turned upside down so that the scanning light device 120 is attached to the bottom side of the scanner housing 402 in the interior region 412 of the scanner lid 400, and the reflective element 408 is attached to the top side of the scanner housing 402 in the interior region 412 of the scanner lid 400. In this alternative embodiment, the scanning light device 120 projects beams of coherent light directly onto the top translucent panel 404, or onto the bottom translucent panel 406 via the reflective element 408.

A method for displaying graphical information in accordance with an embodiment of the invention is described with reference to a flow diagram of FIG. 5. At optional block 502, a lid structure of an electrical apparatus is opened to expose a display surface on the bottom side of the lid structure. At block 504, beams of coherent light are emitted onto the display surface of the electrical apparatus, including scanning the beams of coherent light across the display surface of the electrical apparatus to form the graphical information on the display surface.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An apparatus comprising:
a housing structure having a side including a scanning surface;
a lid structure operably connected to said housing structure, said lid structure moveable relative to said housing structure between at least an open position and a closed position, said lid structure including a display surface;
a scanning light device configured to emit beams of coherent light in a scanning manner to project said beams of coherent light onto said display surface and configured to scan an object placed on said scanning surface; and
a controller operably connected to said scanning light device to control emission and scanning of said beams of coherent light from said scanning light device onto said display surface to form graphical information on said display surface.

2. The apparatus of claim 1 wherein said scanning light device is attached to said housing structure, and wherein said display surface is located at a bottom of said lid structure so that said scanning light device can project said beams of coherent light onto said display surface when said lid structure is in said open position.

3. The apparatus of claim 1 wherein said scanning light device is attached to said lid structure in an interior region of said lid structure, and wherein said lid structure includes a translucent panel at one of top and bottom sides of said lid structure to provide said display surface.

4. The apparatus of claim 1 wherein said scanning light device includes a single linear array of light sources to selectively generate said beams of coherent light.

5. The apparatus of claim 1 wherein said scanning light device includes at least one laser to generate said beams of coherent light.

6. The apparatus of claim 1 wherein said scanning light device includes a beam generator configured to generate said beams of coherent light and a scanning mechanism operably connected to said beam generator to move said beam generator so that said beams of coherent light are scanned across said display surface.

7. The apparatus of claim 1 wherein said scanning light device includes a beam generator configured to generate said beams of coherent light and a scanning reflective device configured to reflect said beams of coherent light in said scanning manner.

8. The apparatus of claim 7 wherein said scanning reflective device of said scanning light device includes a microelectromechanical systems device with at least one movable mirror.

9. The apparatus of claim 1, wherein the controller controls said scanning light device to control emission and scanning of said beams of coherent light from said scanning light device onto said display surface when the lid structure is in the open position and controls the scanning light device to scan the object placed on said scanning surface when the lid structure is in the closed position.

10. The apparatus of claim 1, wherein the apparatus is at least one of a printing device, copying device, scanning device, or multifunction device.

11. The apparatus of claim 1, wherein emission and scanning of said beams of coherent light from said scanning light device onto said display surface occurs directly without any reflection or refraction.

12. The apparatus of claim 1, wherein the graphical information includes printing or scanning related commands or settings.

13. The apparatus of claim 1, wherein the lid structure further comprises a bottom translucent panel used as the display surface when the lid structure is in the open position and a top translucent panel used as the display surface when the lid structure is in the closed position.

14. A lid structure comprising:
a housing having a scanning surface;
a translucent panel attached to said housing at one of said top and bottom sides to provide a display surface; and
a scanning light device attached to said housing in an interior region of said housing, said scanning light device being configured to emit beams of coherent light in a scanning manner to project said beams of coherent light onto said translucent panel to display graphical information on said display surface and configured to scan an object placed near said scanning surface.

15. The lid structure of claim 14 further comprising a reflective element attached to said housing in said interior region of said housing, said reflective element being positioned relative to said translucent panel and said scanning light device to reflect said beams of coherent light from said scanning light device to said translucent panel.

16. The lid structure of claim 15 further comprising an additional translucent panel attached to said housing at the other of said top and bottom sides so that said beams of coherent light can be projected onto one of said translucent panel and said additional translucent panel.

17. The lid structure of claim 14 wherein said scanning light device includes at least one laser to generate said beams of coherent light.

18. The lid structure of claim 14 wherein said scanning light device includes a beam generator configured to generate said beams of coherent light and a scanning mechanism operably connected to said beam generator to move said beam generator so that said beams of coherent light are scanned across said translucent panel.

19. The lid structure of claim 14 wherein said scanning light device includes a beam generator configured to generate said beams of coherent light and a scanning reflective device configured to reflect said beams of coherent light in said scanning manner.

20. The lid structure of claim 19 wherein said scanning reflective device of said scanning light device includes a microelectromechanical systems device with at least one movable mirror.

* * * * *